United States Patent [19]

Gaskill

[11] Patent Number: 5,774,798
[45] Date of Patent: Jun. 30, 1998

[54] LOW POWER DATA RECEIVER COMBINED WITH AUDIO RECEIVER

[75] Inventor: Garold B. Gaskill, Tualatin, Oreg.

[73] Assignee: Seiko Communications Systems, Inc., Beaverton, Oreg.

[21] Appl. No.: 502,807

[22] Filed: Jul. 14, 1995

[51] Int. Cl.⁶ ............................................. H04B 1/18
[52] U.S. Cl. ................. 455/186.1; 455/343; 455/132; 340/825.44
[58] Field of Search .................. 455/140, 343, 455/45, 132, 133, 186.1, 186.2, 6.3, 345; 340/825.44, 825.04

[56] References Cited

U.S. PATENT DOCUMENTS

| | | |
|---|---|---|
| 4,379,947 | 4/1983 | Warner ................. 179/1 GD |
| 5,146,612 | 9/1992 | Grosjean et al. ............ 455/45 |
| 5,170,487 | 12/1992 | Peek ........................... 455/45 |
| 5,394,562 | 2/1995 | Spelter et al. ............ 455/186.1 |
| 5,408,686 | 4/1995 | Mankovitz .................... 455/66 |
| 5,535,428 | 7/1996 | King et al. ................ 455/38.4 |
| 5,572,194 | 11/1996 | Shiota ................... 340/825.25 |

*Primary Examiner*—Edward F. Urban
*Assistant Examiner*—Darnell R. Armstrong
*Attorney, Agent, or Firm*—Elmer Galbi

[57] ABSTRACT

A combined audio receiver and data receiver act in cooperation to serve audio presentation, digital collateral data presentation, and paging functions. The data receiver activates intermittently according to a time-division multiplexed broadcast protocol to receive paging data during brief time slots. At other times, the data receiver tunes to a frequency matching that of the audio receiver to receive digital collateral data descriptive of the audio presentation.

8 Claims, 5 Drawing Sheets

LOW POWER DATA RECEIVER COMBINED WITH AUDIO RECEIVER

BACKGROUND OF THE INVENTION

The present invention relates generally to radio signal broadcast apparatus, and particularly to combined paging, audio, and collateral digital data signal apparatus and method.

Records, songs or audio tracks played over conventional radio stations are heard by listeners with audio receivers tuned to the particular radio station. The radio station operator or disc jockey announces identifying or descriptive information verbally either with respect to each individual audio track or for a sequence of audio tracks. Listeners traditionally have opportunity to only hear the identifying or descriptive information.

Some FM radio signal broadcasts include a subcarrier signal. Subcarrier signals can, for example, deliver paging data to a population of paging devices each of which monitor one or more subcarrier signals. The paging system thereby uses the existing FM signal broadcast facilities, i.e., existing radio stations. The FM broadcast facility receives digital paging messages from a paging system through, for example, a high speed modem coupling the FM broadcast facility to a paging system clearinghouse. The FM broadcast facility includes a subcarrier generator. The subcarrier generator receives the digital paging message information and incorporates this paging message information into its output as a subcarrier signal. The subcarrier generator applies this output to an exciter, and subsequent FM signal broadcasting devices to provide paging messages in the subcarrier portion of the transmitted FM radio signal.

Radio stations can provide collateral material such as advertising or name and author of a record or song being played. For example, the name and author of a given song may appear on a radio display during song presentation. For example, see co-pending U.S. patent application Ser. No. 08/365,859, filed Dec. 29, 1994, entitled TRANSMITTING AND DISPLAYING ON A RECEIVER INFORMATION DESCRIBING BROADCAST PROGRAMS and assigned in common to the assignee of the present invention.

A paging system, especially one with a time-division multiplexed and multi-frequency protocol, introduces difficulty when incorporating also audio and collateral data functions. The paging function must reliably receive paging data transmissions according to paging system protocol including frequency agility and time slot targeting. The collateral data function relative to a given radio station may or may not be a paging system broadcast facility. The audio function must follow user tuning to a desired audio station and present the audio signal continuously with clarity unaffected by any paging or collateral data reception functions.

It would be desirable to provide, therefore, a coordinated use of paging system information and collateral data in the context of an integrated audio and data receiver. The subject matter of the present invention provides such coordinated use of audio, paging, and collateral data.

SUMMARY OF THE INVENTION

A system under the present invention includes an audio receiver tunable to a selected radio station and a low power consuming pager in combination. The pager operates during reception periods to receive paging data, and other times tunes to match tuning of the audio receiver to receive for display collateral data relative to the selected radio station.

A radio signal transmission and reception system under the present invention includes a paging system generating and making available paging data by radio signal transmission according to a paging system protocol. At least one radio signal transmission station transmits a radio signal including an audio portion and a data portion. The data portion includes digital collateral information descriptive of the audio portion. At least one remote receiving device includes an audio receiver and a data receiver. The audio receiver selectively tunes and presents the audio portion of the radio signal. The data receiver selectively tunes as needed to receive paging data according to the paging system protocol, and at other times tunes in response to tuning on the audio receiver to receive digital collateral information corresponding to the audio signal.

A radio signal receiving device method of operation under the present invention includes a high power mode and a low power mode. The high power mode operates in response to availability of an intermittently available power source to receive by radio signal transmission audio, paging message, and digital collateral data. The device takes power from the intermittently available power source when in the high power mode. The low power mode operates in response to non-availability of the intermittently available power source to receive by radio signal transmission paging messages. The device takes power from a constantly available relatively lower power source when in the low power mode.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE ACCOMPANYING DRAWINGS

DETAILED DESCRIPTION OF THE PREFERRED EMBODIMENT

Figure 1:
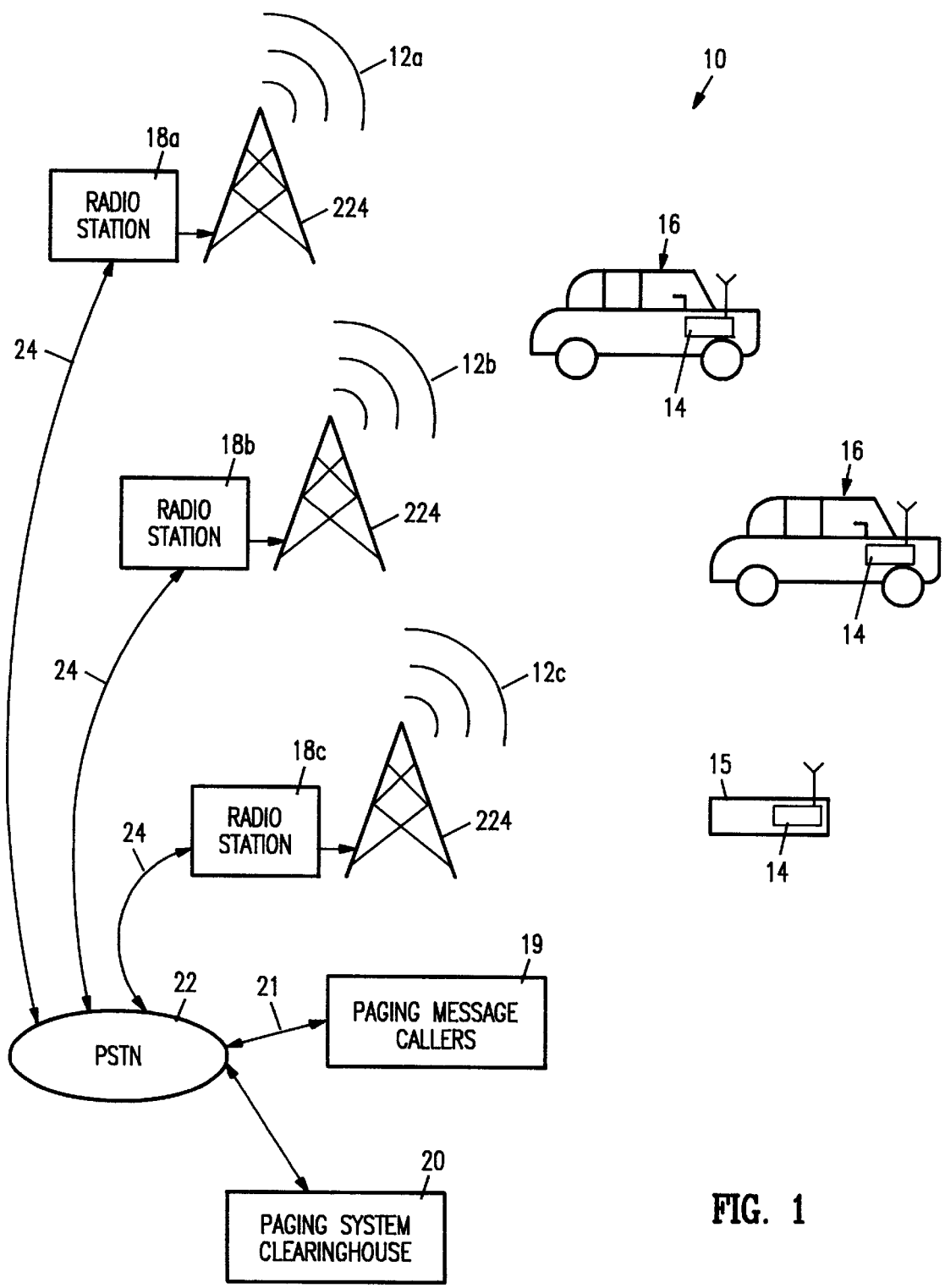
FIG. 1 illustrates a system according to a preferred embodiment of the present invention including a paging system, plurality of radio stations, and plurality of remote receivers each including a low power data receiver combined with an audio receiver.

With reference to FIG. 1, a system 10 in accordance with a preferred embodiment of the present invention will be illustrated in the context of a paging system 20 coupled to a plurality of FM radio stations 18, individually 18a–18c.

Radio stations 18 each transmit a combined audio and data radio signal 12 to a population of remote receivers 14. In the described embodiment, receivers 14 are located in a variety of locations, e.g., home audio system 15 or vehicles 16. While a limited number of radio stations 18 and receivers 14 are illustrated in FIG. 1, it will be understood that the present invention may be implemented with any given number of such radio stations and remote receiving devices.

Callers 19 connect to system 20 and generate paging requests 21 through a public switch telephone network (PSTN) 22. In response, paging system 20 delivers a stream of paging data 24 to radio stations 18 via PSTN 22 according to a time-division multiplexed protocol. Each radio station 18 incorporates paging data 24 into a sideband frequency of its signal 12 by use of a subcarrier generator device. Radio stations 18 transmit the audio portion of signal 12 at a given station frequency in conventional fashion and transmit the sideband or data portion at a given frequency offset relative to the station frequency.

Under paging system 20 protocol, remote paging devices activate at certain brief time slots, monitor a selected sideband signal, and receive a data packet. Addressing schemes associate a given pager with certain time slots and also allow certain pagers to share time slots. Pagers seek paging information by selectively tuning to one of a plurality of radio stations and synchronizing relative to a repeating frame of time slots. Each pager targets a given station frequency and time slot for paging message reception, but otherwise remains dormant during virtually all of the repeating time frame. As paging messages are received, the pagers store and make available for display paging messages addressed thereto. Thus, to reliably receive paging messages, each remote receiver must stand ready to tune to a selected frequency during a selected time slot and receive a data packet.

For a more comprehensive description of a paging system 20, U.S. Pat. No. 4,713,808 shows a paging system including a multi-frequency time-division multiplexed paging system including a clearinghouse and FM radio stations. Each FM radio station provides in a main audio channel an audio signal and provides in a subcarrier signal paging data directed to a population of remote paging devices. The present invention may be implemented in a variety of radio signal transmission systems, however, the present invention will be illustrated by reference to paging system 20. Each of receivers 14 include corresponding receiver decoding circuitry for accessing and decoding the paging system broadcast and protocol.

Each radio station 18 also incorporates into the data portion of its signal 12 information descriptive of the current audio portion presentation, i.e., incorporates digital collateral data, for presentation at receivers 14. While discussed herein generally as textual presentation, it will be understood that digital collateral data may also represent graphic images and may also be converted, e.g. text-to-speech conversion, for audible presentation. As used herein, the term "collateral data" shall refer to a variety of identifying or descriptive information with respect to a given audio presentation, e.g., song title, song classification, producer, artist, advertiser name, radio station identification, and the like. The subject matter of the present invention concerns coordinated reception and use of the audio portion, e.g. voice, music, and announcement presentation; of the data portion, e.g. textual display of collateral data; and of of paging messages, e.g., taken from signals 12 and stored or displayed at receivers 14.

Figure 2:
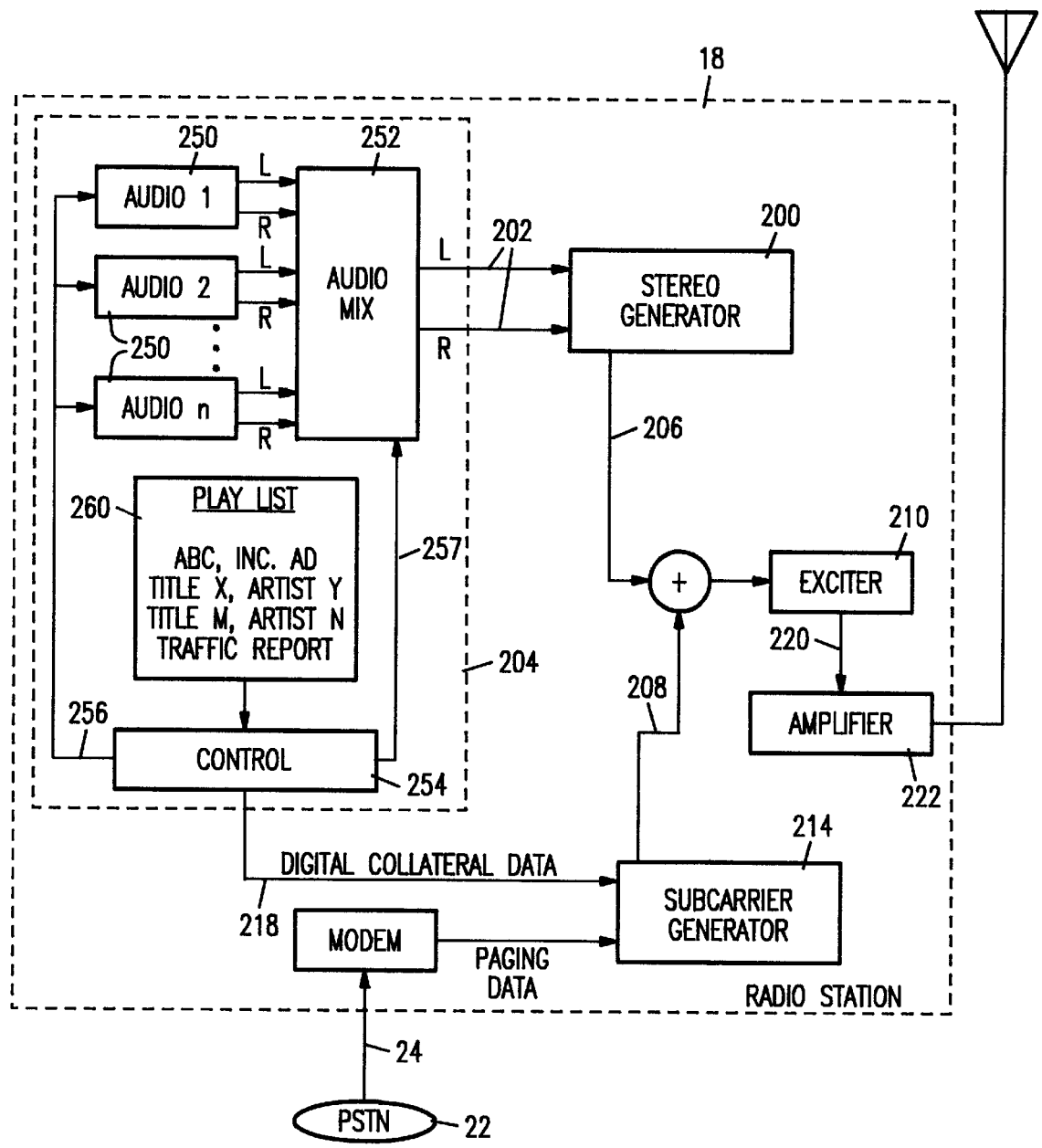
FIG. 2 is a block diagram of one of the radio stations of FIG. 1 including a multiple-component audio source and a subcarrier generator to produce a combined audio and data transmission.

FIG. 2 illustrates generally one of radio stations 18 as coupled to public switch telephone network 22 and providing a combined voice and data radio signal 12. In FIG. 2, a stereo generator 200 receives left and right channels of a main audio signal 202 from a multiple-component programmable audio source 204. In stereo generator 200, left and right channels of signal 202 are combined, subtracted, applied to a pilot generator, and subjected to other known procedures to derive a stereo multiplexed signal 206. Exciter 210 receives the sum of stereo multiplexed signal 206 and a subcarrier signal 208. Excitor 210 applies its output 220 to an amplifier 222 driving antenna 224 and to transmit the combined voice and data radio signal 12 to receivers 14.

A subcarrier generator 214 provides subcarrier signal 208 partially from the stream of paging data 24, obtained by way of modem 216 coupled to telephone network 22, and partially from digital collateral data 218 obtained from audio source 204. Paging data 24 represents the normal flow or stream of paging data obtained from paging system 20 and injected as a subcarrier component of radio signal 12. Digital collateral data 218 represents identifying or descriptive data with respect to audio signal 202. Subcarrier generator 214 incorporates the digital collateral data 218 into the stream of paging data 24 according to paging system 20 broadcast protocol. In the illustrated embodiment, paging system 20 broadcasts paging message data packets during particular time slots according to a time-division multiplexed protocol, and digital collateral data 218 replaces unused data packets in the stream of paging data 24.

A plurality of audio components, or sub-sources, 250 drive an audio mixer 252 producing the audio signal 202 as its output. Components 250 comprise various individual audio sources such as tape machines and CD players storing audio items for programmed presentation by radio station 18. A control 254 applies control commands 256 and 257 to audio components 250 and audio mixer 252, respectively, according to a prearranged play list 260. Play list 260 items specify command information needed to operate a given one of components 250 and further include descriptive or identifying information. Play list 260 thereby dictates operation of control 254 in issuing commands 256 and 257 to components 250 and audio mixer 252, and also serves as a source for the digital collateral data 218.

Figure 3A:
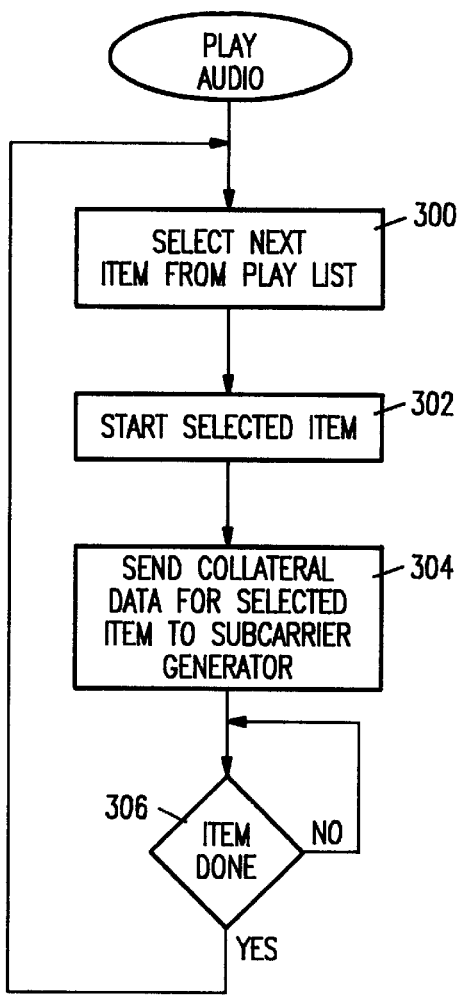
FIGS. 3A and 3B are flow charts illustrating operation of the audio source and subcarrier generator, respectively, of FIG. 2.

FIG. 3A illustrates control 254 operation with respect to audio signal 202 production. In particular, FIG. 3 is a flow chart illustrating a "play audio" routine executed by control 254 of each radio station 18. Control 254 first selects a next item from play list 260 in block 300 and then in block 302 starts play of the selected item. The selected item thereby appears in the audio portion of signal 12 for that radio station 18. Continuing to block 304, control 254 sends corresponding digital collateral data 218 to subcarrier 214. In other words, control 254 sends identifying or descriptive information relative to the audio item just taken from the play list 260 and playing on one of components 250. Programming then loops at decision block 306 until the current audio item completes play. Once complete, processing returns to block 300 where a next audio item is selected and played, and corresponding digital collateral data 218 is sent to subcarrier generator 214.

Figure 3B:
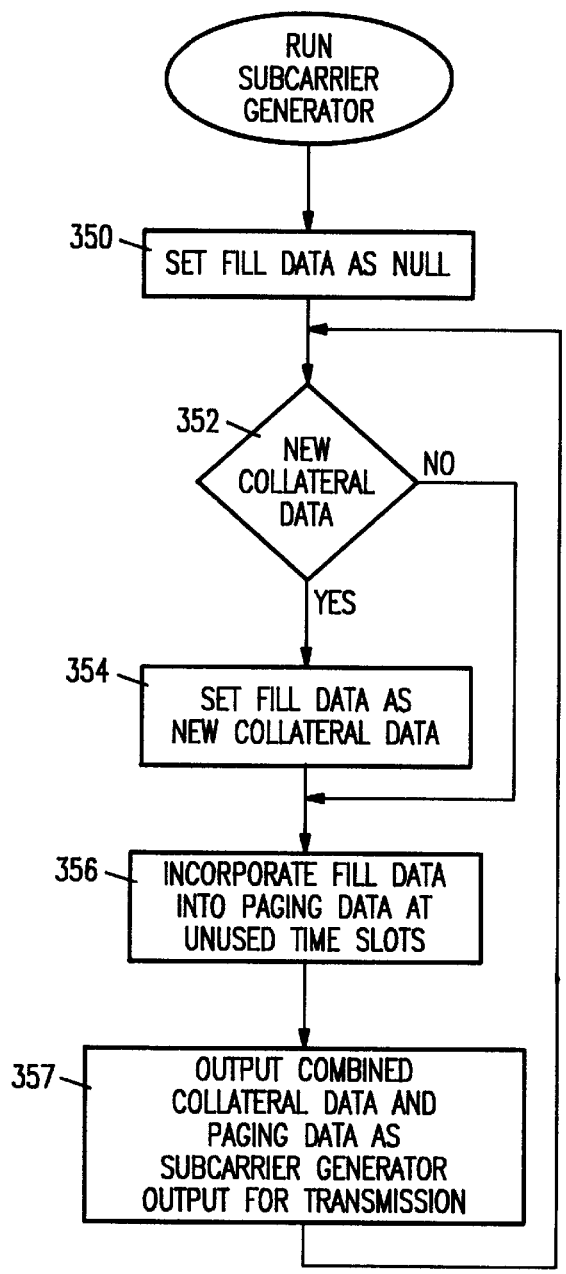

FIG. 3B is a flow chart illustrating operation of the subcarrier generator 214. In FIG. 3B, subcarrier generator 214 initializes in block 350 a FILL DATA variable with a null value and proceeds to decision block 302 where it determines whether new digital collateral data 218 has arrived from audio source 204. If no new digital collateral data 218 has arrived then processing advances to block 354, but if new digital collateral data 218 has arrived subcarrier generator 214 sets the FILL DATA variable to equal the value of the new digital collateral data 218. In block 356 subcarrier generator 214 incorporates the current FILL DATA value into one or more unused data packets of the stream of paging data 24, and thereby fills unused time slots of the paging system 20 protocol with digital collateral data 218 corresponding to the current audio presentation for this radio station 18. In block 357, subcarrier generator 214 provides as its output the combined digital collateral data 218, as generated by the radio station 18, and paging data as generated by paging system 20. Processing then returns to decision block 352 to determine whether new digital collateral data 218 has arrived from audio source 204.

In this manner, each radio station 218 presents a series of programmed audio items in the audio portion of its signal 12 while concurrently presenting in the data or subcarrier portion of its signal 12 combined digital collateral data 218 and paging data 24. As illustrated in this particular embodiment, each radio station 18 serves as a paging system 20 transmission facility. Under the present invention, however, a given radio station 18 need not be part of the paging system 20 transmission facility. In such case, the radio station 18 would include a subcarrier generator, but need not combine paging data with digital collateral data. The broadcast 12 would then include an audio portion and a data portion including only digital collateral data.

Figure 4:
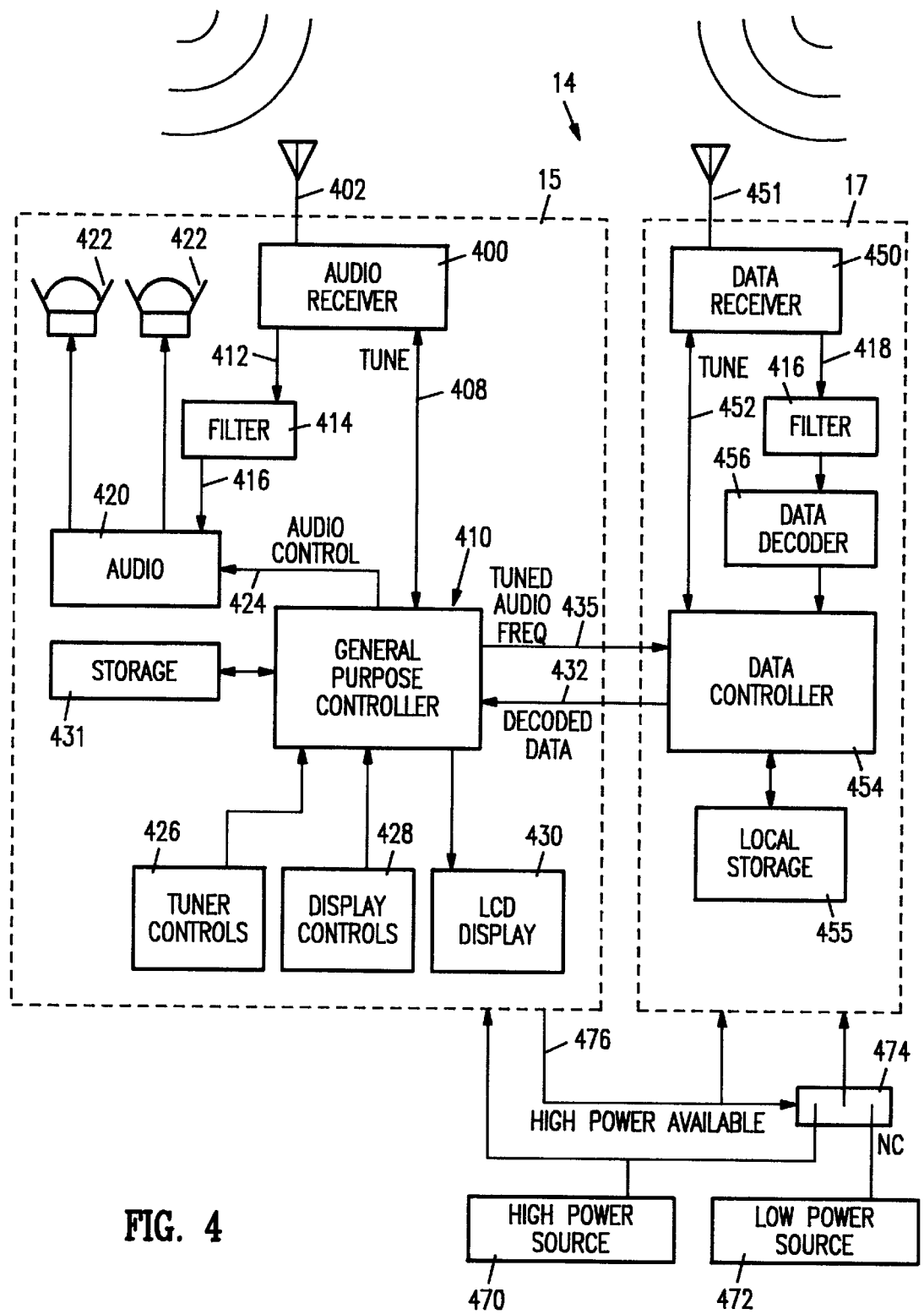
FIG. 4 is a block diagram of one of the remote receivers of FIG. 1.

FIG. 4 illustrates in simplified block diagram a receiver 14 as contemplated under the present invention. Receivers 14 each include an audio portion 15 and a data receiver portion 17. Data portion 17 is a low power device corresponding generally to a pager under system 20. The audio portion corresponds generally to a conventional FM audio receiver. Each of portions 15 and 17 are modified to establish interaction therebetween and operation under the present invention as described herein. The data portion 17 selectively monitors the data portion of one signals 12 as necessary to satisfy the desired paging function according to system 20 protocol. Further, when not seeking paging messages and when sufficient power is available, data portion 17 monitors the subcarrier of a specific signal 12 as indicated by the audio portion 15 of receiver 14, i.e. collects collateral data 218 corresponding to the user-selected radio station 18.

An audio receiver 400 receives, via antenna 402, a signal 12 from one of radio stations 18 as established by a tune signal 408 originating from a general purpose controller 410. Receiver 400 applies the baseband composite signal 412 to a filter 414 to obtain an audio signal 416. Audio signal 416 drives an audio block 420 coupled to a pair of speakers 422 and operating in response to a volume, balance, and tone control signal 424 originating from controller 410. Tuner controls block 426 includes conventional FM radio control buttons and knobs in implementation of the tune signal 408 and volume, balance, and tone control signal 424. Display controls block 428 provides user-buttons for manipulation of a textual display at LCD display block 430, e.g., manipulation of paging message and collateral data textual presentation.

Audio portion 15 of each receiver 14 operates generally as a conventional FM radio receiver tunable to a given FM station for presentation of an audio signal at speakers 422. Modification relative to conventional operation includes and interface to the data portion 17 of receiver 14. In particular, general purpose controller 410 provides to data controller 454 a tuned audio frequency 435 representing the station 18 to which audio receiver 400 is currently tuned, i.e., a representation of tune signal 408. Further, a data controller 454 of data portion 17 provides to general purpose controller 410 decoded data 432 whereby storage and presentation of paging data 24 and digital collateral data 218 is accomplished by the storage and user-interface resources of audio portion 15 of receiver 14. This arrangement avoids duplication of display and storage resources in the receiver 14. As may be appreciated, however, data portion 17 could be provided with its own storage and display resources. Such arrangement would further minimize the interface between data portion 17 and audio portion 17 of receiver 14, and minimize modifications relative to conventional audio receiver design. As will be discussed more fully hereafter, data portion 17 does include a small local storage block 455 for storing selected data packets when general purpose controller 410 is unavailable, i.e., not operating for lack of high power source 470 availability.

Data receiver 450 monitors, via antenna 451, the subcarrier or data portion of a selected station 18 signal 12 according to a tune signal 452 provided by a data controller 454. A filter 416 couples the data receiver 450 output 418 to a data decoder block 456. Decoder block 456 reacts to paging system 20 protocol to extract therefrom a sequence of data packets. Receiver 14, according to paging system 20 operation, activates only during certain targeted and brief, i.e., 13 millisecond, time slots to receive paging messages. Such time-division multiplexed protocol conserves battery power. As illustrated herein, however, when sufficient power is available, e.g. vehicle 16 ignition power present, controller 454 monitors constantly a sequence of data packets derived from the data portion 418 taken from radio signal 12.

Controller 454 provides selected data packets 432 to controller 410. Controller 454 evaluates received data packets in implementation of a given paging system 20 addressing scheme, i.e., keeping those data packets 432 addressed specifically to a given receiver 14, and also in implementation of the present invention keeping those data packets 432 carrying representation of digital collateral data 218 identifying and describing a current audio presentation in the radio signal 12 to which the audio receiver 400 is currently tuned. Controller 454 determines the current tuning of audio receiver 400 by reference to the tuned audio frequency 435 provided by general purposed controller 410.

LCD display block 430 allows controller 410 to present textually the content of data packets 432 in response to user manipulation of display controls block 428. Storage block 431 allows controller 410 to save a given number of data packets 432. Thus, controller 410 interacts with blocks 428, 430, and 431 according to an established user-interface to implement selected storage and textual display of paging data 24 addressed to receiver 14 and digital collateral data 218 collected by receiver 14.

Each receiver 14 has two power sources, i.e., a high power source 470 and a low power source 472. High power source 470, e.g., a vehicle 16 power system, provides power for the audio portion 15 of each receiver 14, but may not always be available. Low power source 472, e.g., a small battery such as a watch battery, remains always available to provide power for data portion 17 when high power source 470 is not available. Switch 474 receives energy from high power source 470 and from low power source 472. Switch 474 applies to data portion 17 the high power source 470 when available and otherwise applies low power source 472. A high power available signal 476 drives switch 474 to apply the selected power source to data portion 17. Further, data portion 17 monitors the high power available signal 476 to determine the current power mode.

Generally, when operating from low power source 472, data portion 17 operates according to its normal paging function, i.e., activating at certain targeted time slots and monitoring certain stations 18 to receive data packets bearing paging messages addressed to that particular paging receiver. When high power source 470 is available and when higher priority paging functions are dormant, data portion 17 constantly collects data packets from a radio station 18 sideband frequency corresponding to the radio station 18 to which audio receiver 400 is currently tuned. Data portion 17 thereby reacts to availability of power and performs the additional function of digital collateral data 418 reception without excessively diminishing the low power source 472 and without interrupting normal paging message reception functions.

While a particular power source arrangement has been illustrated in FIG. 4, it will be appreciated that the present invention may be applied to a variety of power source arrangements. For example, receiver 14 could be incorporated into an AC-powered device, e.g., home audio system 15. In such case, high power source 470 is only be available when the device is switched-on or plugged into a wall receptacle. At other times, low power source 472 is always available for operation of data portion 17 to reliably execute the higher priority paging function.

Figures 5A, 5B:
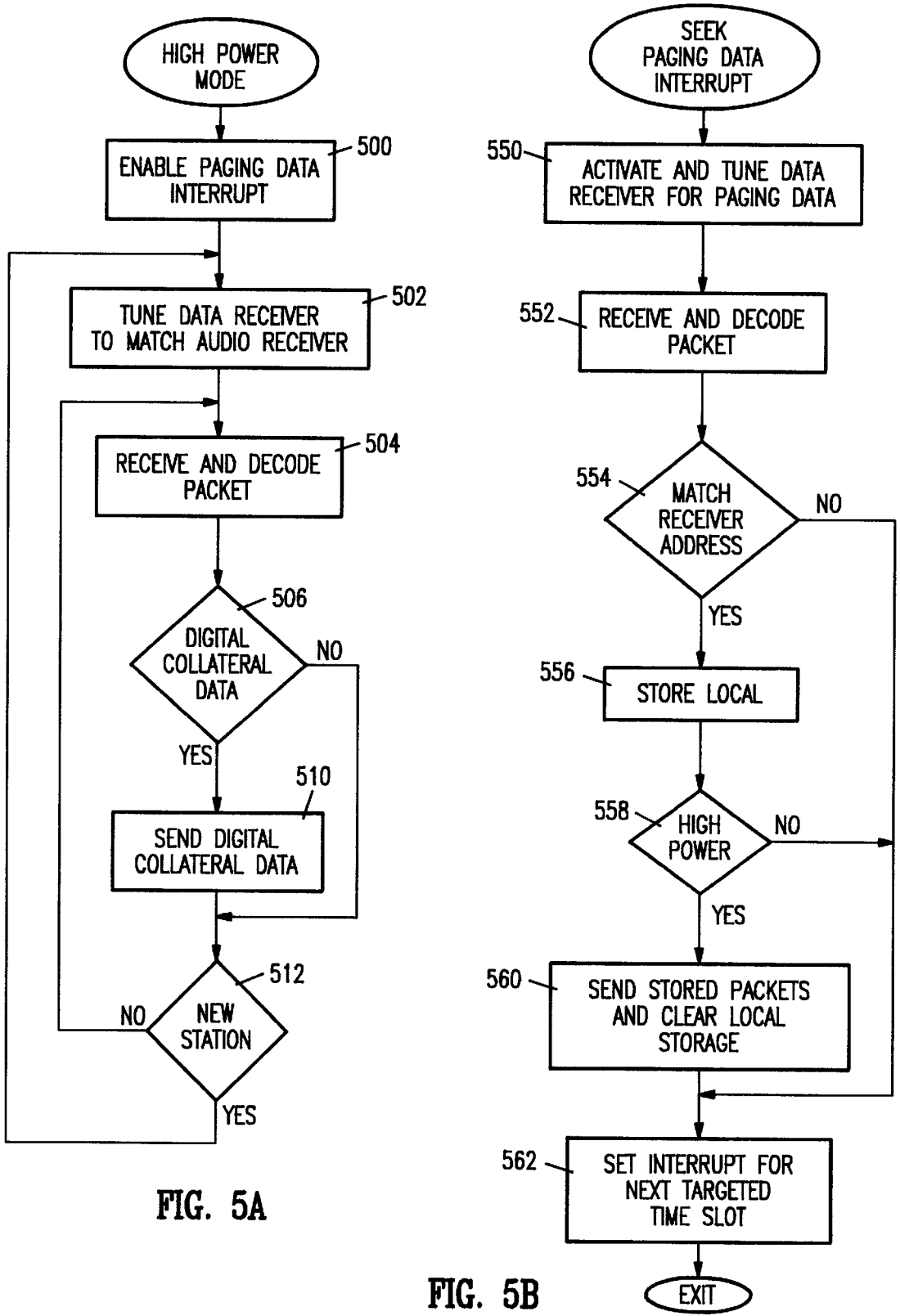
FIG. 5A is a flow chart illustrating a high power mode of operation for the data receiver portion of a remote receiver of FIG. 1.
FIG. 5B is a flow chart illustrating a paging data interrupt routine for the data receiver portion of the remote receiver of FIG. 1.

FIGS. 5A and 5B are flow charts illustrating programming for data controller 454. In particular, FIG. 5A shows a high power mode of operation for controller 454 executed when sufficient power is available to allow constant monitoring of digital collateral data 218. FIG. 5B shows operation relative to receiving of paging data 24, in particular a seek paging data interrupt routine executed with reference to the repeating time frame of system 20 protocol to activate and monitor a selected signal 12 sideband transmission during a targeted time slot. The interrupt procedure of FIG. 5B occurs regardless of high power source 470 availability, there being low power source 472 always available for operation of data portion 17. When high power source 470 is available, however, processing of FIG. 5A occurs with the interrupt routine of FIG. 5B enabled to allow collection of paging data 24 as a higher priority function relative to collection of digital collateral data 218.

In FIG. 5A, controller 454 reacts to the availability of high power source 470 by first enabling in block 500 the interrupt processing, i.e. paging message targeting and collection, of FIG. 5B. Continuing to block 502, controller 454 references its tuned audio frequency 435 input and tunes data receiver 450 to match the current tuning of audio receiver 400. In block 504 controller 454 receives a data packet according to paging system 20 protocol. Processing then advances to decision block 506 where controller 454 interrogates the content of the received data packet to identify representation of the digital collateral data 218 therein. As may be appreciated, data packets carrying digital collateral 218 include an identification field differentiating digital collateral data 218 from paging messages.

If the received data packet carries digital collateral data 218, then processing advances to block 510 where controller 454 sends the just-received digital collateral data 218 to controller 410 as decoded data 432 for textual presentation at display block 430. Otherwise, processing advances to decision block 512. In decision block 512, controller 454 determines if the user has switched to a different station 18 by again referencing its tuned audio frequency 435 input. If audio receiver 400 has been tuned by the user to a new frequency then processing returns to tuning block 502, but otherwise returns to receiving block 504.

FIG. 5B illustrates the paging data interrupt routine executed by data portion 17 of receiver 14 regardless of availability of high power source 470. In FIG. 5B, processing begins in block 550 where controller 454 activates data receiver 450 and data decoder 456 and also tunes data receiver 450 by application of tune signal 452. Important to note, activation, i.e., initiation of the FIG. 5B interrupt process, corresponds to a selected or targeted time slot of system 20 broadcast protocol associated with this particular receiver 14. Tuning in block 550 corresponds to a selected one of radio stations 18 targeted for collecting specific paging data. System 20 broadcasts information redundantly on radio stations 18, with a given time offset between station 18 time frames. In this manner, a pager switches frequencies, i.e., tunes to a different station 18 and synchronizes to its offset time frame. Thus, each pager seeks paging data by selecting a particular radio station 18 and time slot relative to that radio station 18 time frame.

Continuing to block 552, controller 454 receives and decodes a data packet. In decision block 554, controller 454 compares its address with an address field of the decoded packet, i.e., determines whether the data packet is addressed to this particular receiver. If the address fails to match, processing branches from decision block 554 to block 562 where controller 454 sets its interrupt for a next targeted time slot, i.e., a next occurrence for the paging data interrupt routine of FIG. 5B. Processing of FIG. 5B then exits from block 562.

If, however, the decoded data packet is addressed to this particular receiver 14, then processing branches from decision block 554 to block 556 where controller 454 stores the decoded data packet in local storage block 455. As may be appreciated, local storage block 455 is of sufficient size to hold a desired number of decoded data packets, i.e., capable of storing a given number of paging messages. Following storage, processing advances to decision block 558 where controller 454 determines availability of high power source 470, i.e., references high power command 476. If high power source 470 is currently being used, then processing branches to block 560 where controller 454 sends stored data packets to general purpose controller 410 and clears from local storage block 455 the stored data packets. Processing then advances from block 560 to block 562 and continues as described above. If high power source 470 is not being used, i.e., general purpose controller 410 not available to accept decoded data packets, then processing branches from decision block 558 directly to block 562.

Thus, a low power data receiver combined with audio receiver has been shown and described. The data portion may be incorporated into existing device design by appropriate interface coupling. For example, the data portion may be incorporated into vehicle radios, home audio systems, personal computers, and generally into any existing product form as a mechanism to manage both paging functions and also digital collateral data. By providing access to a high power source, the device advantageously collects all digital collateral information on a given radio station. A second low power source remains constantly available to serve the higher priority paging functions. In this manner, a receiver 14 presently unused remains available to collect paging data.

It will be appreciated that the present invention is not restricted to the particular embodiment that has been described and illustrated, and that variations may be made therein without departing from the scope of the invention as found in the appended claims and equivalents thereof.

What is claimed is:

1. A system comprising:

an audio receiver tunable to a selected radio station; and a low power consuming pager having paging signal reception periods during which paging data is received, the pager being responsive at time other than said paging signal reception periods to tuning of said audio receiver to receive collateral data relative to said selected radio station.

2. A system according to claim 1 wherein said pager responds to availability of an intermittently available power source by receiving power therefrom and receiving said digital collateral data.

3. A radio signal transmission and reception system comprising:

a paging system generating and making available paging data by radio signal transmission according to a paging system protocol;

at least one radio signal transmission station transmitting a radio signal including an audio portion and a data portion, the data portion including digital collateral information descriptive of said audio portion; and at least one remote receiving device including an audio receiver and a data receiver, said audio receiver being selectively tunable and presenting said audio portion of said radio signal, said data receiver being selectively tunable to receive said paging data according to said system protocol and also tuned in response to tuning of said audio receiver to receive said digital collateral information.

4. A system according to claim 3 wherein said at least one receiver operates selectively in a first mode and a second mode, said first mode being invoked and maintained according to said paging system protocol and causing reception of said paging data, said second mode being invoked in response to availability of a given power source and causing reception of said digital collateral data and said paging data.

5. A system according to claim 3 wherein said radio station also receives from said paging system said paging data and transmits said paging data in combination with said digital collateral data.

6. A system according to claim 3 wherein said paging data is transmitted by said radio signal.

7. A system according to claim 6 wherein said radio station combines said digital collateral data and said paging data for transmission a sideband frequency relative to its audio portion transmission frequency.

8. A system according to claim 3 wherein said at least one remote receiver includes a first power source and a second power source, said first power source being maintained constantly, said second power source being maintained intermittently, said at least one receiver selectively using said second power source when available and receiving said digital collateral data when using said second power source.

* * * * *